United States Patent [19]
Taylor

[11] 3,722,640
[45] Mar. 27, 1973

[54] FLUID AMPLIFIED LIQUID SPRING SHOCK ABSORBERS WITH IMPROVED PISTON HEADS

[76] Inventor: Paul H. Taylor, 3877 E. River Rd., Grand Island, N.Y. 14072

[22] Filed: Mar. 26, 1971

[21] Appl. No.: 128,266

[52] U.S. Cl..................................188/316, 188/322
[51] Int. Cl. ...............................................F16f 9/19
[58] Field of Search...............................188/316, 322

[56] References Cited

UNITED STATES PATENTS

| 3,186,702 | 6/1965 | Taylor | 188/316 X |
| 3,266,603 | 8/1966 | Kamimoto | 188/316 |
| 3,369,674 | 2/1968 | Carle | 188/316 X |
| 3,628,638 | 12/1971 | Curchack | 188/316 X |

FOREIGN PATENTS OR APPLICATIONS 941,330   11/1963   Great Britain.......................188/322

Primary Examiner—George E. A. Halvosa
Attorney—Hume, Clement, Hume & Lee

[57] ABSTRACT

A highly efficient, low cost liquid spring shock absorber capable of fluid amplification and the generation of square energy waves and having a uniquely shaped piston head is provided for use in vehicle bumpers, automotive shock absorption systems and the like.

7 Claims, 18 Drawing Figures

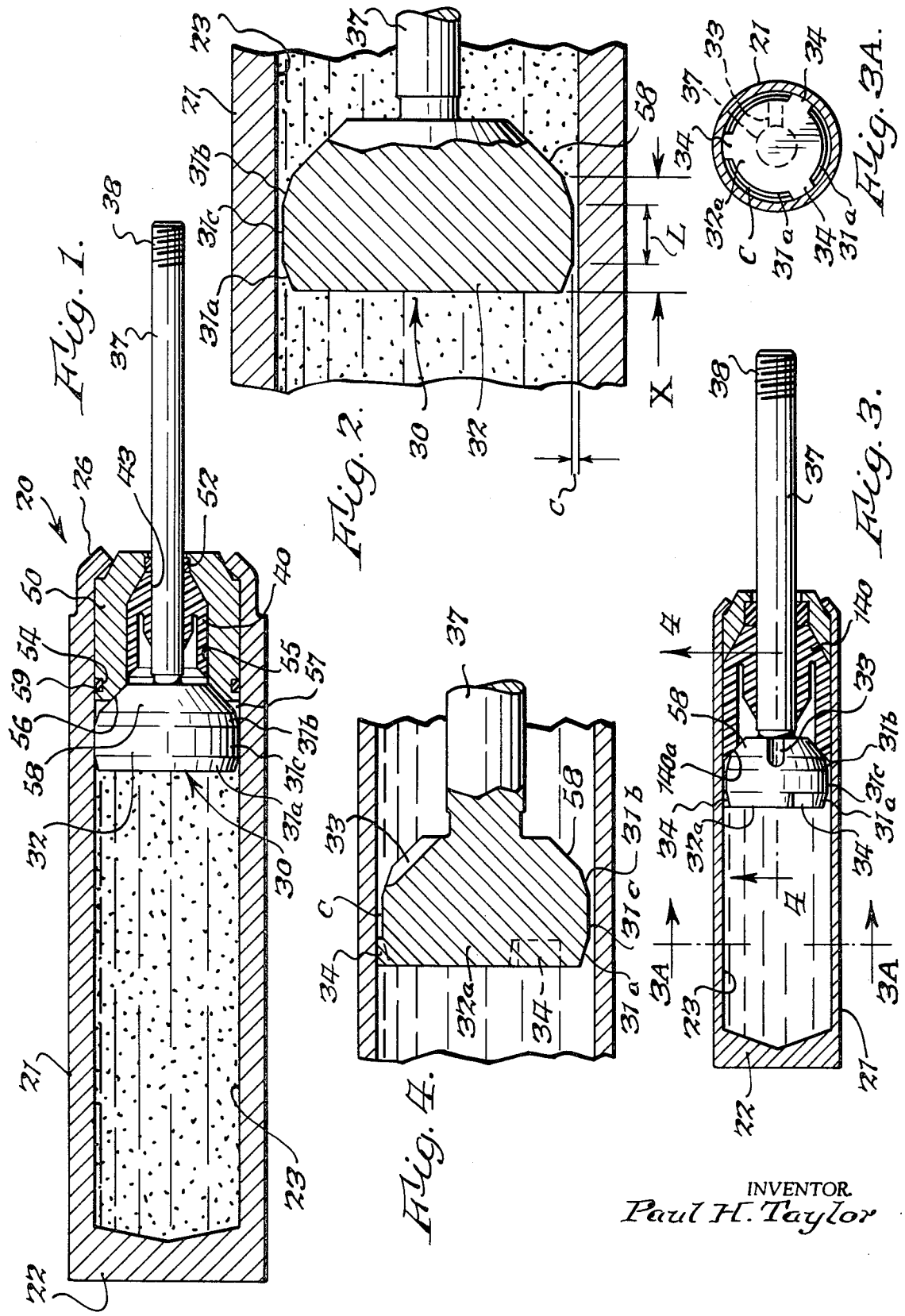

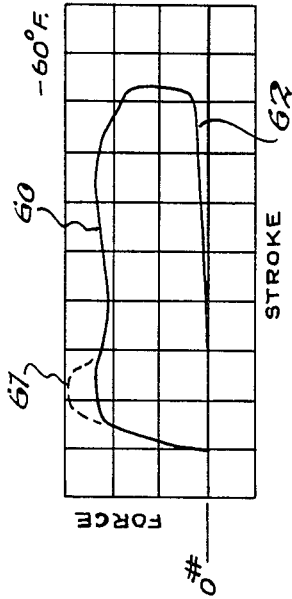
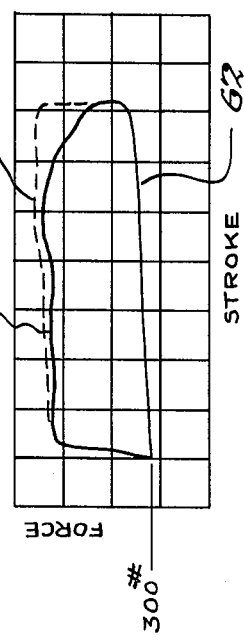
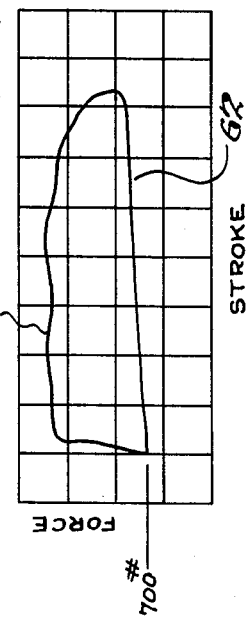
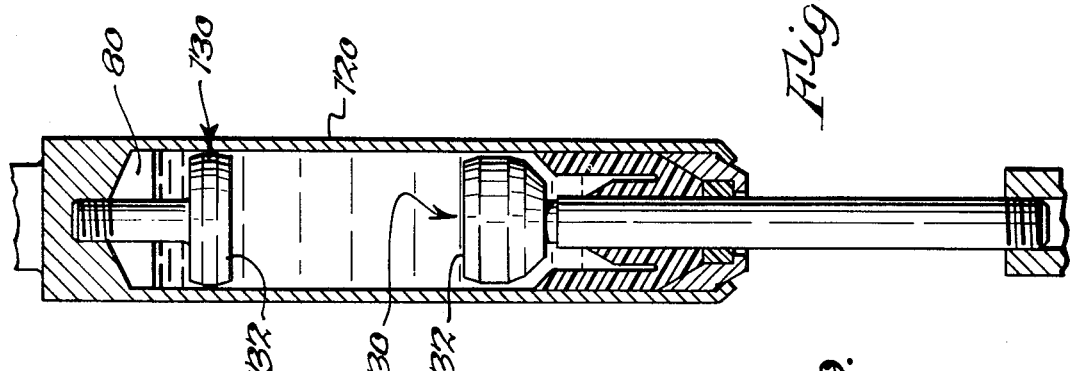
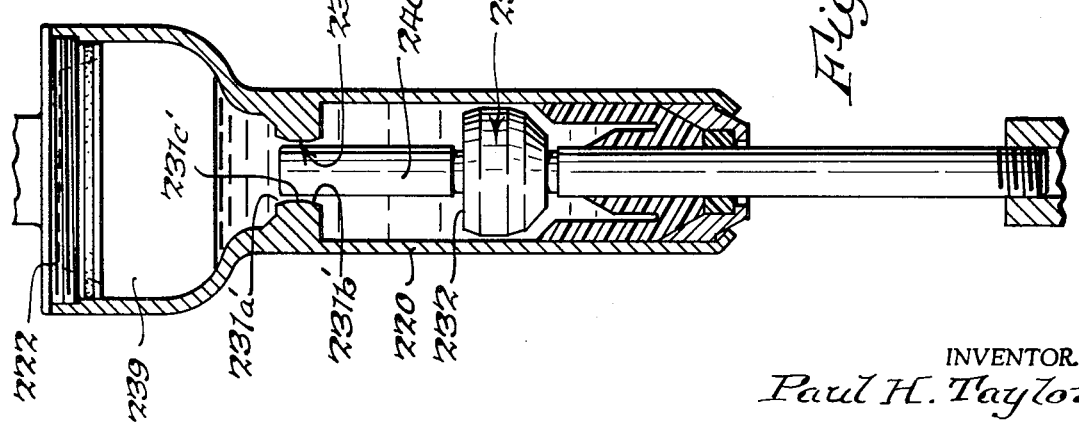
INVENTOR.
Paul H. Taylor

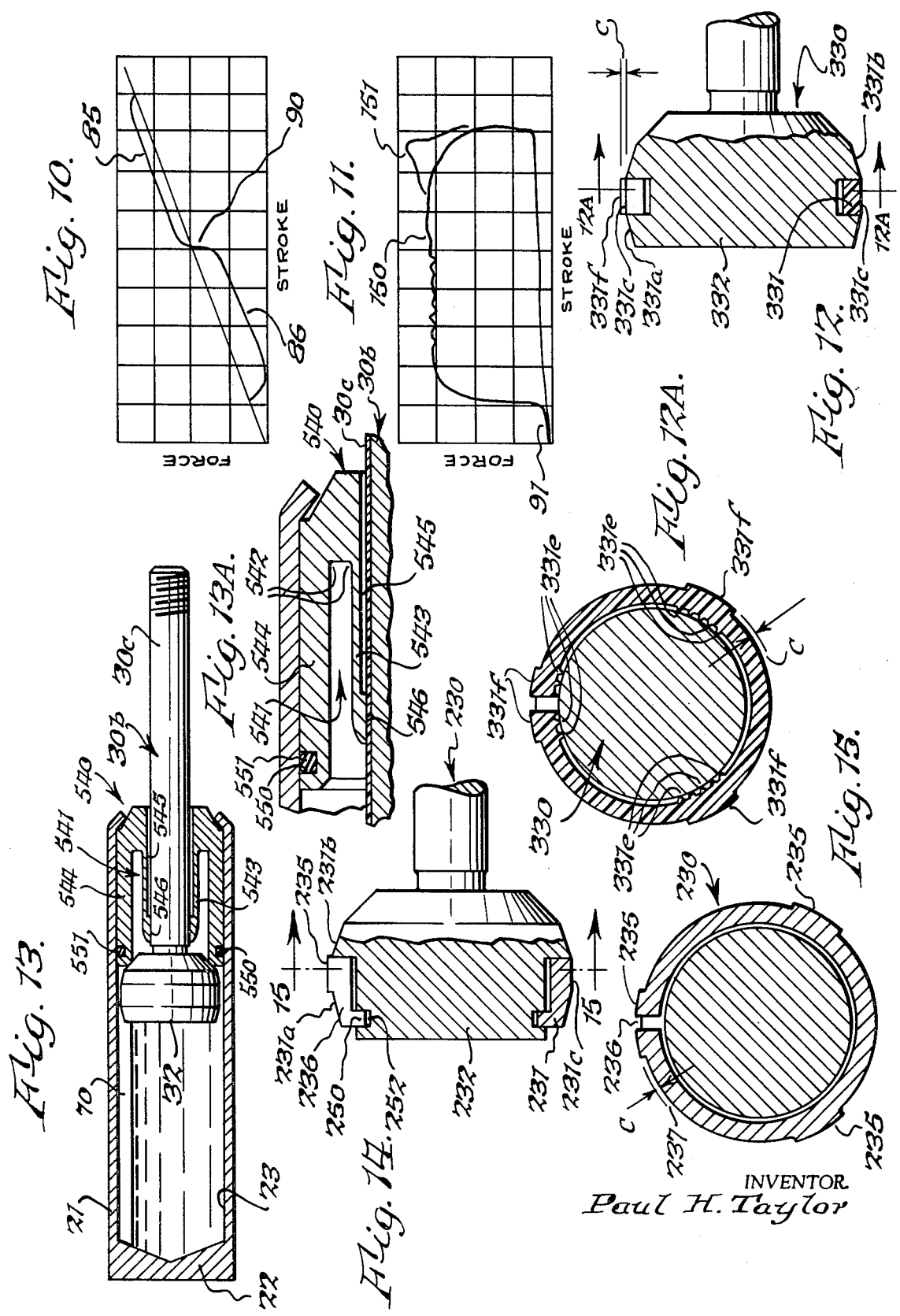

FLUID AMPLIFIED LIQUID SPRING SHOCK ABSORBERS WITH IMPROVED PISTON HEADS

BACKGROUND OF THE INVENTION

This invention generally relates to shock absorbers and more particularly to liquid spring shock absorbers having a unique piston head design.

The increasing emphasis on automobile safety standards has recently given rise to a significant need for new, lightweight, efficient shock absorption systems. More specifically, the front and rear bumper designs for many new automobiles will require shock absorption systems capable to absorbing five to ten mile-per-hour collisions without substantial damage to vehicle operating parts.

Although a number of techniques have been proposed for such rigid shock absorption standards, liquid spring shock absorbers appear to offer one of the more efficient, reliable and low cost techniques for automobile and related vehicle shock absorption. It has been determined, for example, that bumper shock absorber systems for automobiles require a low cost unit that provides high efficiency at one critical velocity for energy absorption. In the case of an automobile bumper, which typically has a 10,000 pound limit load on the automobile frame, the ideal shock absorber input is a square wave at approximately 9,500 pounds of force. This design would avoid damage to the automobile at the highest velocity commensurate with the limited distance designers will permit a bumper to extend beyond the automobile. Virtually the same limitations, of course, are required in freight car cushioners where the distance the coupler can travel is predicated on the ability of the car to engage a curve without decoupling.

It has also been determined that in liquid spring shock design, any square energy wave produced is a combination of the spring curve and the shock curve for the absorber. A perfect shock absorber, for example, will provide an increasing load equal to the increased force on the spring. Thus it is desirable that a shock absorber become less efficient in direct proportion to the spring increase in order to provide a desirable square energy wave.

In addition, cost considerations require that a shock absorber capable of use in automotive bumpers and the like be capable of mass production for various loads from the same parts. The unique shock absorber of this invention satisfies both the low cost and square energy wave requirements.

SUMMARY OF THE INVENTION

In accordance with this invention a new liquid spring shock absorber is provided by selecting a series of uniquely shaped piston heads that make the shock absorber highly efficient, economical, capable of generating efficient square energy waves at specific velocities, and capable of internal fluid amplification in relation to impact velocities.

More specifically, this invention provides a shock absorber having a housing adapted to hold a body of fluid, sweeping means, such as a piston head, slidably disposed within the housing, and a body of compressible fluid within the housing. The sweeping means has a shaped peripheral surface which forms a fluid passage clearance between it and the housing and which has a centrally disposed flat land section positioned parallel to the housing and two inclined sections disposed on opposite ends of the land section and extending downwardly therefrom.

BRIEF DESCRIPTION OF DRAWINGS

The various embodiments of the shock absorbers of this invention will be better understood by reference to the following drawings.

FIG. 1 is a vertical longitudinal section of a typical shock absorber construction of this invention.

FIG. 2 is an enlarged but fragmentary sectional view of a shock absorber of this invention with the shock absorber head partially in section.

FIG. 3 is a sectional view similar to FIG. 1 but illustrating a different seal structure for the shock absorber.

FIG. 3A is a vertical cross section along line 3A—3A of FIG. 3, and showing a modified shock absorber piston head.

FIG. 4 is an enlarged fragmentary view similar to FIG. 3 of the modified piston head.

FIGS. 5, 6, and 7 are graphs showing performance characteristics of some of the shock absorbers of this invention at temperatures of −60°F, 70°F, and 210°F.

FIG. 8 is a vertical section of a modified automobile shock absorber embodiment of this invention.

FIG. 9 is a sectional view similar to FIG. 8 of an automotive shock absorber having a gas chamber.

FIG. 10 is a performance graph showing the operating characteristics of the shock absorber shown in FIG. 8.

FIG. 11 is another performance graph, in this instance of the embodiment of this invention shown in FIG. 13.

FIG. 12 is a view of a piston head partially in section showing a clearance providing ring for large tolerance shock absorber use.

FIG. 12A is a cross section taken along 12A—12A of FIG. 12.

FIG. 13 is a vertical sectional view through an air-oil spring used in a horizontal position in which air is used to give low initial shock resistance.

FIG. 13A is an enlarged fragmentary view of a portion of FIG. 13.

FIG. 14 is a fragmentary view of a piston head with a modified clearance ring.

FIG. 15 is a sectional view of FIG. 14 taken along line 15—15.

DESCRIPTION OF VARIOUS EMBODIMENTS

FIG. 1 illustrates one embodiment of the liquid spring shock absorber of this invention which is a type of construction suitable for use in automobile bumper shocks and industrial crane buffers. This embodiment generally comprises a liquid spring assembly 20, an integrated piston and head 30, a seal 40, and a cap 50. The seal 40 is held in place by means of cap 50 and the cylinder crimp end 26. In this assemblage piston 30 engages rod 37 which in turn has a threaded end 38. Integral shock absorber head 32 which is attached to rod 37 can be made and is sometimes made in two pieces.

In this configuration the liquid spring piston 37 operates in a bore 43 of seal 40 and acts as the liquid spring piston. The shock absorber piston head 32 is reciprocal in the cylinder bore 23 and acts as a shock absorber head. Together piston 37 and head 32 provide an integrated liquid spring shock, e.g., both spring and shock absorber. While the cylinder 21 has a closed end 22, it can of course have a separate closure which can be joined by threads, brazing, or other methods to the cylinder 21. Cap 50 has an O-ring groove 54 with a seal 59 sealing the bore 23, and a counterbore 55 in which the seal 40 is retained with an interference fit to avoid leakage. A guide ring 52 ahead of seal 40 prevents extrusion of the seal 40, if for example the seal 40 is made of "Teflon." If, however, the seal 40 is made of polyamide, or other structural plastics, guide ring 52 need not be used.

A conical surface 58 on cap 50 has a slightly different conical angle than the rear angle 31c on the head of piston 32. In order to prevent check valving on sudden piston movements, conical surface 58 eliminates an initial force burble 61 as shown in the graph of FIG. 5. A triangular cavity 57 is formed by the end 56 of cap 50 and the angle 31b of head 32 so as to provide a fluid cavity within the shock absorber. This avoids the burble 61 (FIG. 5) on initial stroking of the device by providing that the flow past head 32 impinges upon fluid rather than metal. This has been found to be a very desirable feature of the shock absorbers of this invention in the developing of the square energy wave shown in the enclosed devices. If, for example, this cavity is not provided, the piston must then be spaced down the bore by external mechanical means. This feature, of course, is very desirable in bumper shock use, in industrial cranes, and wherever the resisting structure has a light load.

Now, referring more particularly to head 32, it should be noted that the shape of head 32 is a practical and inexpensive substitute for a DeLaval nozzle shaped piston head in which fluid amplification occurs in the nozzle incorporated in the piston head. In effect the shape of head 32 formed by angles 31a, land 31c, angles 31b and 58, provides in effect a practical DeLaval nozzle formed externally on the piston head which can be press formed, contour ground, machine cast, or otherwise externally formed by rapid production processes. Thus, the benefits of fluid amplification can be accomplished by the unique piston heads of this invention without the need for actually incorporating DeLaval nozzle arrangements in the head structure.

As shown in FIG. 2, the greatly enlarged view of piston head 32, an entrance angle 31a of about 7°–19°, a flat diametral land or clearance section 31c and a composite exit nozzle 31b–58 consisting of angle 31b blending into back seat angle 58 are preferred because they provide an effective DeLaval nozzle 31 with simple straight surfaces. The preferred angle for angles 31a and 31b is about 14° and the respective lengths of the angles generally being one-third the distance from the face of head 32 to the end of angle 31b for each angle, the remaining one-third being made up of the flat section 31c of the head 32.

FIG. 6 shows a curve 60 which is generally the preferred energy curve for a shock absorber capable of use in automotive bumpers or crane buffers. Curve 60 is a performance curve for a definite force level which in the case of an automobile station wagon is 9,500 pounds limit force, parallel to the abscissa of the graph. Since this shock curve is made up of spring curve 62 and a shock resistance shown in curve 60, it is clear that the shock absorber head declines in its resistance as the spring force is increased. Dotted line 63 in FIG. 6 shows a 100 percent energy curve for a shock absorber which is made up of the spring force 62 superimposed on a constant shock force. Various configurations of a shock curve such as 60 or 63 can be developed by adjusting the assembly of the shock absorber head 32. If for instance a specific shock curve 63 is desired the length proportions of the shock head are as previously stated ⅓ 31a, ⅓ 31b, and ⅓ 31c. Now, however, if a curve 60 of 85 percent efficiency is desired an increase in the length of land 31c to 80 percent of the overall distance and a decrease to 10 percent of the overall length in angles 31a and 31b will provide it. In general what is desired is an entrance angle of approximately 7° to 19°, an exit angle of approximately 7° to 19° on a head approximately the radius of the bore in thickness in combination with lands and angles as noted to cause the proper shock resistance. The length of the 45° angle 58 is determined independent of the other relationships and can be as long or as short as desired but preferably should be at least the length of one of the other angle lands to get the most desirable flow characteristics in the shock absorber. In addition, in the presently preferred embodiment of this invention, the distance X between the front of head 32 and the back of angle 31b is approximately two thirds the diameter of head 32.

Now referring back to FIG. 1, it will be noted that the fluid material in this spring has been shown as a composite liquid and solid. The shock absorbers of this invention have worked well with silicone liquids, hydraulic fluids, nylon powder mixed with a light lubricant, polyethylene powder, silicone rubber, natural rubber, and many other substances, or composites. Silicone materials are preferred, however, because of the viscous effect which they cause between the piston head 32 and wall 21 and particularly because the wide range of viscosities for silicone compositions provide a high degree of flexibility and range of operating conditions for the shock absorbers of this invention.

If granular material like powdered "Teflon" or nylon is used it preferably has a lubricated external surface which is accomplished by a mixture of silicone, hydraulic fluids, water, grease or other materials sufficient to lubricate its passage by the contoured head 32. While fluid flows relatively easy when lubricated, some difficulty has occurred with fluid and powder getting behind the head and solidifying. In the case of some plastics, if a lubricant is not used, the powder is turned to solid. Accordingly, some wetting agent for the solid particles, preferably something like a hydrocarbon or silicone, is desirably used in the practice of this invention. When the various types of liquids noted, or solids, are used, the clearances at the flat land section 31c is generally increased. However, all of the various fluid materials described herein provide the curves of FIGS. 5, 6, and 7, that is an essentially a flat 95 percent energy response curve 60 or a 90 percent curve 63 with 100 percent dampening, all without metering pins, pressure responsive valves, or other types of metering devices. In effect then even the dry powder, when accompanied with slight lubrication, becomes a liquid flowing past the external surface of the head and behaving as a liquid passing through a DeLaval nozzle.

FIG. 3 shows another version of this same liquid spring shock. Here the angle face 58 of the piston head is now bearing directly against the seal lip 140a. The piston head 32a is grooved at 33 to prevent the same check valving causing the burble 61 as previously mentioned in regard to FIG. 1. While not specifically shown, it should be understood that this device might also employ a small hole in head 32a in place of the groove 33 in order to relieve pressure in the shock absorber.

If the seal 140 is constructed from nylon and the cylinder bore 23 is sufficiently large so that the seal is correspondingly large, towing loads can be taken from thread 38 piston 37, to face 58 of head 32 and seal 140. Any other structural plastic can be so employed. Since nylon or structural plastics have shock absorbing characteristics towing shocks will be dissipated by plastic movement.

Head 32a is further distinguished from the other embodiments of this invention by the pads 34 which have the following characteristics: they can be used to cut part of the angle area out of the head permitting the land cylinder clearance (C) to be larger with less tolerance and these pads 34 can be a separately attached or integral or can be incorporated into a piston ring as in FIGS. 12, 12A or 15.

In FIGS. 5, 6, and 7 the performance characteristics of the shock absorbers of this invention at different temperatures are shown. It will be noted that the liquid spring curve 62 increased from a zero lb. preload of FIG. 5 at $-60°F$. to 300 lbs. at ambient and to a high preload, 700 lbs., in FIG. 7 at 210°F. It will thus be apparent that while the spring force varies considerably with temperature the shock head and shock resistance is constant, a feature that is only common to this shock absorber head or a pressure responsive valve.

FIG. 8 shows this shock configuration as it would be applied to a conventional vehicle shock absorber. It is shown in the vertical position because being an automobile shock absorber it would be the normal orientation of the device with respect to the vehicle. Since an automobile shock absorber is expected to provide the shock curves of FIG. 10 which occur normally about the midpoint 90 or support level of the suspension it is well to discuss operation about that mid-point 90. In normal shock absorber devices used on vehicles today the impacting resistance of the shock absorber should be sufficient to provide 10 percent of the total energy absorption of the system curve 85, e.g., 90 percent of the energy is stored energy in the mechanical spring of the suspension. The stored energy of the suspension then fires the wheel back to the pavement and it is here that 90 percent of the total shock resistance is encountered, curve 86. Thus a shock absorber having 30 lbs. compressive resistance will have 300 lbs. extension resistance. Actually, vehicle shock absorbers as they are presently used are inefficient. Since on extension the dashpot area is less than that of the piston rod, it has high pressure and on compression its whole area is effective. Thus when the load is the lightest, the area is the greatest and the pressure the lowest. This of course presents many design problems which are overcome by the shock absorbers of this invention.

In FIG. 8 the liquid shock absorber 120 has the same piston head 32 of previous piston assembly 30. An air chamber 80 is provided above the fluid level. To avoid the elastic response of air a separator piston 130 having a shock head 132 of the general configuration specified heretofore having surfaces $31a'$, $31b'$, and $31c'$. On compression, flow by piston 32 is metered through a tight orifis of shaped head 32 and head 132 the double metering is caused to provide a resistance on compression of 10 percent of total requirements on extension liquid under head 32 is metered around tight head 32 causing a high rebound shock force. This provides a rebound force of 270 lbs. to take the stored energy out of the spring system and prevents the wheel and suspension being fired back to the pavement. This slows the wheel to a velocity wherein it dampens the rebound, keeping the suspension in contact with the ground for the greatest interval of time. Without the fluid amplified head 130 and with an external reservoir this shock would be a 70–30, 70 percent on compression and 30 percent on rebound which would be fine for a high-speed race car but unsuited for a passenger car. With the reservoir and minus the air head it would be a liquid spring shock absorber.

FIG. 9 illustrates a shock absorber similar to FIG. 8, but with an enlarged gas chamber 239 formed between cap 222 and cylinder 220. This could actually be used as an air spring, the interior fluid amplified configuration $230'$ can be formed by the surface $231a'$, $231b'$, and $231c'$ in connection with a metering pin 240 which can either be straight or tapered depending on the shape of shock curve desired. If the curve of FIGS. 5 through 7 are required a straight metering pin will suffice. If a spring rate type curve is desired a progressively diminishing type would accomplish this result. By utilizing a metering pin 240 in a reduced metering bore 230 the tolerance or clearance between the parts is less critical than with head 32. Piston 230 is conventional with respect to my invention except for the metering probe extension 240.

FIGS. 12, and 12A illustrate a piston head 330 which has a groove 330a formed therein to accept a piston ring 331. The purpose of piston ring 331 is to provide the proper clearance or orifis clearance C between the cylinder and the piston head to accomplish the desired shock mitigation results, with parts having greater tolerances than customary. This, of course, assumes that the cylinder bore and piston ring require large tolerances to accomplish a low cost commercial product.

Piston ring 331 is preferably made of "Teflon" or FEP, materials known for their cold flow tendencies. A series of small protuberances 331e formed on the inner surface of the ring have a smaller cross section than a series of large protuberances 331f on the external part of the piston ring 331. When shaped head 330 is put in a bore of appropriate size the greater structural strength of the larger protuberances 331f causes the protuberances 331e to be crushed and cold flow so that clearance C is maintained irrespective of piston wall tolerance considerations. FIGS. 13 and 13A illustrate a horizontal application of an air-oil spring. They are characterized by a metallic seal cap 540 useful in low cost applications, such as an automobile bumper shock, which has a maximum of 200 cycles to run over a 5- year life of the car. Thus this configuration is a liquid spring shock which will function for such few cycles in a more than adequate fashion. This construction has another useful application as shown in FIG. 13A where a long lived absorber is desired, such as in a normally zero pressured device in a horizontal overhead crane buffer. In this situation an air-reservoir 70 shown in FIG. 13 provides the necessary displacement so that pressure on the seal configuration is not exerted by hydraulic pressure unless the liquid spring bottoming feature is used as will be described hereinafter. This configuration consists of a combination cap and metallic seal 540 with a large fluid energizing groove 541 having the small radii as 542 for efficient cold extruding at the bottom of the groove. This metallic seal is designed in a manner in which it can be readily impact extruded from an aluminum, bronze or other material capable of providing this bearing and low modulus of elasticity for seal compliance. The inner seal lip 543 is of extremely thin cross-section (i.e., in the case of a ½ inch piston rod being less than 0.010 of an inch in thickness). A relieved section 545 and a short bearing section 546 are characteristics of the sealing surface. Bearing section 596 rests against the plastic coating 30c which covers piston rod material 30b. Typically a "Teflon" coating can be used at 30c if it is a homogenous "Teflon", or some other suitable plastic such as "Delrin", nylon or other plastic which is not machined or otherwise acted upon after the electrostatic dipping or coating process can be used. "Teflon", for example, is a polymer such as polytetrafluroethylene while "Delrin" is a linear polyoxymethylene type acetal resin. Thus, a smooth finish is left on the external part of the plastic which seals on the lip 546. In turn, the spring like action or interference at lip 546 is only an interference in the neighborhood of 0.002 of an inch on a ½ inch rod. The springing of the plastic or yield of the plastic coating, (which coating is approximately 0.005 of an inch thick) provides a sealing configuration for the shock absorber.

When an air-oil spring is employed as shown in FIG. 13 the metallic interference assumes sealing whereas the plastic seal is a similar device often cold flows and loses its tension without internal pressure.

With respect to this air-oil application, on impacting of piston 30 the gas or air in chamber 70 flows by piston head 32 immediately, leaving only fluid ahead of head 32 in cylinder 20 for square wave energy absorbtion. This configuration provides the shock curve of FIG. 11 wherein initial portion of the stroke 91, exhibits no shock resistance after which the normal shock curve 150 take place as shown in FIG. 11. Depending upon the volume of gas a liquid spring curve 151 can be additive when the air has been compressed to a minute volume and the compressibility of liquid takes over. Such a configuration is desirable in a ladle car buffer in steel mills where hard bottoming is eliminated by the curve 151 in case of car overtravel. In FIGS. 14 and 15 there is illustrated a second piston ring configuration 230 similar to FIG. 12 but characterized by a metallic piston ring. The piston ring 231 having protuberances 235 and a split 236 to accommodate reduction in circumference due to various tolerance cylinders. A clearance C provides a gap 237 of the desired shock configuration. Piston ring 231 further has downwardly extending annular ring 250 entrapped in groove 252 of the piston head 32. This configuration permits wide variations in tolerance of cylinders while limiting the flow to that desired for the shock absorber.

It should be understood that various modifications and changes in the embodiments discussed herein can be made without departing from the spirit and scope of this invention.

I claim:

1. In a shock absorber having housing means adapted to hold a body of fluid, a piston head slidably disposed within said housing means and a body of compressible fluid within said housing means, the improvement comprising said piston head having a longitudinal axis and a shaped peripheral surface forming a fluid passage between said housing means and said shaped surface and said shaped surface having a centrally disposed flat clearance surface parallel to said housing means, a flow entrance surface on one side of said flat clearance surface sloped in a direction from said flat surface toward said axis, and at least two spaced first and second flow exit surfaces on the opposite side of said flat clearance surface sloped in the direction from said flat surface toward said axis, whereby the flow of fluid passed and shaped peripheral surface causes fluid amplification in said shock absorber and the generation of essentially square energy waves.

2. In a shock absorber having housing means adapted to hold a body of fluid, piston head slidably disposed within said housing means and a body of compressible fluid within said housing means, the improvement comprising said piston head having a longitudinal axis and a shaped peripheral surface forming a fluid passage between said housing means and said shaped surface and said shaped surface having a centrally disposed flat clearance surface parallel to said housing means, flow entrance surface on one side of said flat clearance surface sloped in a direction from said flat surface toward said axis, and at least two spaced first and second flow exit surface on the opposite side of said flat clearance surface sloped in the direction from said flat surface toward said axis, said flow entrance surface and said first flow exit surface being oriented at an angle of about 7° to 19° in relation to said flat clearance surface, said second flow exit surface being oriented at an angle of about 45° in relation to said flat clearance surface, whereby the flow of fluid passed said shaped peripheral surface causes fluid amplification in said shock absorber and the generation of essentially square energy waves.

3. The shock absorber of claim 2 wherein the respective lengths of said land section, said flow entrance surface and said first flow exit surface are equal and wherein the overall combined lengths of said land section, said inclined flow entrance surface and said first flow exit surface is about two-thirds the diameter of said piston head.

4. The shock absorber of claim 2 wherein at least one flat land area parallel to said housing means is cut out of said flow entrance surface.

5. The shock absorber of claim 2 wherein said piston head is provided with a circumferential groove formed around the land section of said peripheral surface, and a piston ring disposed in said groove and shaped so as to provide a fixed clearance between said piston head and said housing means.

6. The shock absorber of claim 2 wherein a second piston head is secured to said housing means opposite said slidably disposed piston head.

7. The shock absorber of claim 6 further characterized by an air chamber provided above said body of compressible fluid.

* * * * *